(12) United States Patent
Harman et al.

(10) Patent No.: US 11,464,227 B2
(45) Date of Patent: Oct. 11, 2022

(54) ENHANCED MICROBIAL AND BIORATIONAL CONTROL OF NEMATODE PESTS OF PLANTS

(71) Applicant: ADVANCED BIOLOGICAL MARKETING, INC., Van Wert, OH (US)

(72) Inventors: Gary Harman, Geneva, NY (US); Molly Cadle-Davidson, Geneva, NY (US); Walid Nosir, Geneva, NY (US)

(73) Assignee: ADVANCED BIOLOGICAL MARKETING, INC., Geneva, NY (US)

(*) Notice: Subject to any disclaimer, the term of this patent is extended or adjusted under 35 U.S.C. 154(b) by 132 days.

(21) Appl. No.: 16/639,070

(22) PCT Filed: Mar. 30, 2018

(86) PCT No.: PCT/US2018/025590
§ 371 (c)(1),
(2) Date: Feb. 13, 2020

(87) PCT Pub. No.: WO2018/183976
PCT Pub. Date: Oct. 4, 2018

(65) Prior Publication Data
US 2020/0221705 A1    Jul. 16, 2020

Related U.S. Application Data

(60) Provisional application No. 62/479,084, filed on Mar. 30, 2017, provisional application No. 62/479,080, filed on Mar. 30, 2017, provisional application No. 62/479,074, filed on Mar. 30, 2017.

(51) Int. Cl.
| | |
|---|---|
| *A01N 31/02* | (2006.01) |
| *A01N 63/12* | (2020.01) |
| *A01N 63/20* | (2020.01) |
| *A01N 63/38* | (2020.01) |
| *A01N 43/08* | (2006.01) |
| *A01N 43/16* | (2006.01) |
| *A01N 43/36* | (2006.01) |
| *A01N 43/72* | (2006.01) |
| *A01N 43/90* | (2006.01) |
| *A01C 1/06* | (2006.01) |
| *C05G 5/12* | (2020.01) |
| *C05F 17/20* | (2020.01) |
| *C05G 5/30* | (2020.01) |
| *C05G 3/60* | (2020.01) |

(52) U.S. Cl.
CPC ............. *A01N 31/02* (2013.01); *A01C 1/06* (2013.01); *A01N 43/08* (2013.01); *A01N 43/16* (2013.01); *A01N 43/36* (2013.01); *A01N 43/72* (2013.01); *A01N 43/90* (2013.01); *A01N 63/12* (2020.01); *A01N 63/20* (2020.01); *A01N 63/38* (2020.01); *C05F 17/20* (2020.01); *C05G 3/60* (2020.02); *C05G 5/12* (2020.02); *C05G 5/30* (2020.02)

(58) Field of Classification Search
None
See application file for complete search history.

(56) References Cited

U.S. PATENT DOCUMENTS

| | | | |
|---|---|---|---|
| 6,060,051 A | 5/2000 | Heins et al. | |
| 6,210,665 B1 | 4/2001 | Heins et al. | |
| 6,242,420 B1 | 6/2001 | Hanson et al. | |
| 2003/0186852 A1 | 10/2003 | Heins et al. | |
| 2008/0175930 A1 | 7/2008 | Baseeth et al. | |
| 2011/0027232 A1 | 2/2011 | Harman et al. | |
| 2014/0323297 A1 | 10/2014 | Harman et al. | |
| 2015/0057157 A1 | 2/2015 | Baseeth et al. | |
| 2015/0157027 A1 | 6/2015 | Harman | |
| 2016/0015029 A1 | 1/2016 | Baseeth | |
| 2016/0073640 A1 | 3/2016 | Curtis et al. | |

FOREIGN PATENT DOCUMENTS

| | | |
|---|---|---|
| EP | 0997074 A1 | 5/2000 |
| WO | WO9850422 A1 | 11/1998 |
| WO | WO9910477 A1 | 3/1999 |
| WO | 2010091337 A1 | 8/2010 |
| WO | WO2013078365 A1 | 5/2013 |
| WO | 2013134267 A1 | 9/2013 |
| WO | WO2014036474 A1 | 3/2014 |
| WO | WO2014085576 A1 | 6/2014 |
| WO | WO2015011615 A1 | 1/2015 |
| WO | WO2015126256 A1 | 8/2015 |

(Continued)

OTHER PUBLICATIONS

Foy, Chester L. "Progress and developments in adjuvant use since 1989 in the USA." Pesticide Science 38.2-3 (1993): 65-76.*

(Continued)

*Primary Examiner* — Alton N Pryor
(74) *Attorney, Agent, or Firm* — Reising Ethington P.C.

(57) ABSTRACT

This disclosure describes a biological system of plant growth promotion, pest resistance and disease resistance by application of strains of *T. viride, Trichoderma harzianum* K2, *Bacillus amyloliquifaciens* AS2, *Bacillus amyloliquifaciens* AS3, or a combination thereof. These strains can be used in conventional or organic agriculture for the promotion nematode resistance when applied topically as a foliar spray or as a seed coating. The highly active strains also are expected to increase plant productivity and improve quality of fruits, vegetables, flowers or other plant products.

15 Claims, 9 Drawing Sheets

(56) References Cited

FOREIGN PATENT DOCUMENTS

| WO | WO2016011562 A1 | 1/2016 | |
|---|---|---|---|
| WO | WO2016189329 A1 | 12/2016 | |
| WO | 2017192117 A1 | 11/2017 | |
| WO | WO-2018183976 A1 * | 10/2018 | ............. A01N 63/20 |

OTHER PUBLICATIONS

Dennis, Paul G., et al. "The effects of glyphosate, glufosinate, paraquat and paraquat-diquat on soil microbial activity and bacterial, archaeal and nematode diversity." Scientific reports 8.1 (2018): 1-9.*

Yang, Zhongshan, et al. "Nematicidal effect of volatiles produced by Trichoderma sp." Journal of Asia-Pacific Entomology 15.4 (2012): 647-650.*

Extended European Search Report regarding corresponding EP App. No. 18777372.6; dated Dec. 1, 2020.

EP Office Action, Application No. 18 777 372.6-1110, Applicant: Advanced Biological Marketing, Inc., dated Dec. 12, 2021.

Ertot; Ilaria, et al.; Focus Group Soil-Borne Diseases; Mini-paper—The use of microbial biocontrol agents against soil-borne diseases; eip-agri, dated 2015 (11 pages).

Kergunteuil, Alan, et al.; Biological Control beneath the Feet: A Review of Crop Protection against Insect Root Herbivores; dated Nov. 29, 2016 (22 pages).

Timmusk, Salme, et al.; Perspectives and Challenges of Microbial Application for Crop Improvement; Frontiers in Plant Science, vol. 8, Article 49 dated Feb. 9, 2017 (10 pages).

Brazilian Office Action for BR Application No. 112019020483.0 dated May 24, 2022 (3 pages).

* cited by examiner

FIG. 1A  FIG. 1B
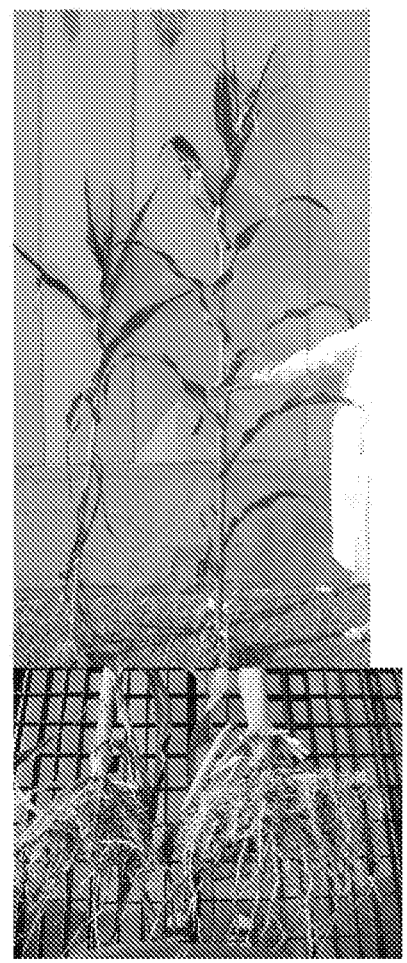
FIG. 2
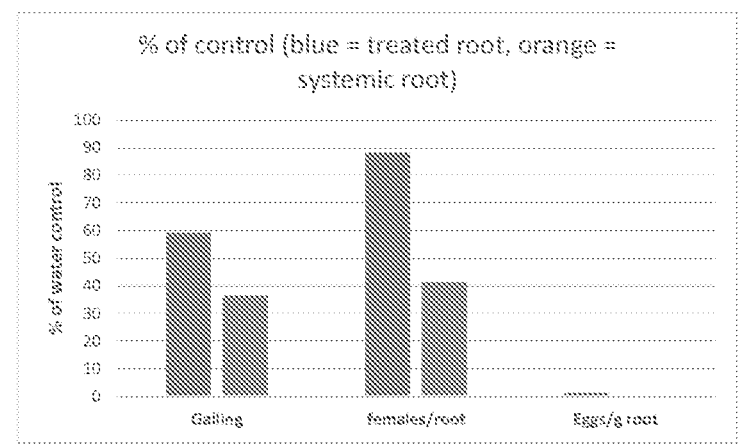

Soybean treatments

All treatments contained Extender and Bradyrhizobium. Seeds treated with Cruiser Max before biologicals.

ENHANCED MICROBIAL AND BIORATIONAL CONTROL OF NEMATODE PESTS OF PLANTS

RELATED APPLICATIONS

This application claims priority to U.S. Provisional Application No. 62/479,074, filed Mar. 30, 2017; U.S. Provisional Application No. 62/479,080, filed Mar. 30, 2017; and U.S. Provisional Application No. 62/479,084, filed Mar. 30, 2017. The entire contents of these applications is hereby incorporated by reference in their entirety.

TECHNICAL FIELD

This disclosure relates to data and microbial strains with utility in controlling nematode pests of plants.

BACKGROUND ART

The following description is provided to assist the understanding of the reader. None of the information provided or references cited is admitted to be prior art.

Physical *Trichoderma* grows intercellularly in the root epidermis and cortex and induces the surrounding plant cells to deposit cell wall material and produce phenolic compounds. This plant reaction limits the *Trichoderma* growth inside the root (see Yedidia et al., "Induction and Accumulation of PR Proteins Activity During Early Stages of Root Colonization by the Mycoparasite *Trichoderma harzianum* Strain T-203," Plant Physiol. Biochem. 38:863-873 (1999), which is hereby incorporated by reference in its entirety). Endophytic plant symbionts have much longer periods of efficacy since they have the ability to grow with plants and in the environment; therefore if conditions are favorable for them, they may have effects for weeks or months. These organisms may develop on or in plant roots and provide benefits to plants for at least the life of an annual crop (Harman, G. E., "Myths and Dogmas of biocontrol. Changes in Perceptions Derived from Research on *Trichoderma harzianum* T-22," Plant Dis. 84:377-393 (2000) and Harman et al., "Changing Paradigms on the Mode of Action and Uses of *Trichoderma* spp. for Biocontrol," Outlooks Pest Manag. 19:24-29 (2008), which are hereby incorporated by reference in their entirety). The establishment of living hyphae of the beneficial organisms in the root cortex results in chemical communication with the plant. See WO 2013/078365.

SUMMARY

In one aspect, the present disclosure relates to, inter alia, the discovery and development of a biological system of plant growth promotion by application of highly effective strains of microbes, microbial combinations and metabolites. The strains of the present invention outperform the best current strains of various microbial species used for this purpose available commercially. It can be used in conventional or organic agriculture for the promotion of plant growth and increase in crop yields when applied topically as a foliar spray or as a seed coating. It consists of a biologically active strain of *Trichoderma* spp.

The highly active products also increase plant productivity and improve quality of fruits, vegetables, flowers or other plant products. Microbial agents applied as seed treatments or other methods of application have been shown to increase plant growth and development. In some embodiments, the most effective of these organisms colonize plant roots internally and induce beneficial changes in gene expression and that therefore give rise to changes in plant physiology. These alternations in plant physiology include coordinated up-regulation of entire biochemical pathways in plants. These changes comprise: reliable and consistent plant growth and yield promotion; enhanced root growth and development resulting in larger and deeper root systems; improved resistance to such abiotic stress including too little or too much water, salt and soil contamination; increased fertilizer use efficiency and especially nitrogen fertilizer use efficiency; and enhanced antioxidant levels in produce.

All of the effects noted above require energy, and can only occur if photosynthesis is enhanced. These microbial agents efficiently improve photosynthesis. Beneficial microorganisms with the capabilities described above, in some embodiments, have been and are used commercially. Previous product may entail mixtures of a fungus in the genus *Trichoderma* and a bacterium in the genus *Bacillus*, e.g., sold as QuickRoots™. This product does increase yields, but in numerous replicated trials it was relatively inconsistent. An improvement in consistency of performance was developed by Applicants, where the strains of *Trichoderma* spp. can be combined (different specific strain mixtures are present in the products sold for different crops), and have been sold under the tradename SabrEx™. These products give the advantage just enumerated above, in some embodiments, and provide consistent yield improvements of about 8.5 bushels of maize per acre. In some embodiments, other crops give comparable results and include soybeans, rice, cotton, vegetables, alfalfa and other forage legumes, and small grains including wheat.

The present disclosure, moreover, concerns, in some embodiments, the strain *Trichoderma atroviride* NRRL B-50520 (formerly *Trichoderma virens*), which was isolated from a chicken manure compost. It, along with two other fungi, was selected for their abilities to produce ammonia and amino acids from bird feathers because of its high levels of proteinase activity in certain embodiments. The ammonia and amino acids provide nitrogen to plants, while feathers themselves are broken down very slowly and do not provide immediate nutrients for plant growth. In other embodiments of the claimed invention, strain 50520 is exploited to release nutrients for plant growth.

In the present disclosure, we describe the use of this strain as plant growth promoting agent in suitable embodiments. It provides superior plant growth advantages when compared to the prior art, including SabrEx, which is probably the most effective commercially available product for plant growth promotion. The Applicants have discovered that, the primary mode of action of the claimed invention is via seed treatment, with other applications and embodiments demonstrating efficacy with respect to foliar applications on various plant sources, such as, e.g., wheat. Since it is effective as a seed and as a foliar treatment, there are various other embodiments and applications that are effective, such as, e.g., including: applications as an in-furrow granule; application as a soil drench where the organism will come into contact with roots and colonize roots; application as a root treatment, e.g., during transplant operations; and as a component of liquid or solid fertilizers. In many embodiments, the organism comes into contact with roots and establishes a beneficial relationship with the plant leading to plant growth promotion.

Likewise, the present disclosure is also highly effective in control of various deleterious organisms including plant pathogenic bacteria, fungi and nematodes. Nematodes contain structural proteins (collagens) in the outer surface and in eggs. In other work, *Trichoderma* strains with high levels of effective enzymes that degrade proteins such as keratin (in feathers) or collagen are effective in control of plant parasitic nematodes (Sharon, Bar-Eyal et al. 2001), includes eggs and the worms themselves. Thus, the present disclosure includes claims to control of both nematode and plant pathogenic microorganisms.

In one aspect, the present disclosure provides seed treatments that have microbial agents as the active ingredients, primarily, but not only, fungi in the genus *Trichoderma*. The products of the present disclosure reliably alleviate effects of plant stresses, such as drought, flooding, salt or disease, and increase yields. In one embodiment, substantial increases in biomass including root size provides for significant alleviation of greenhouse gases and, to an additional extent, water pollution from nitrates and nitrites. In some embodiments, the strains of the present disclosure have the capabilities to induce changes in corn and other plants to give: greater yields with much larger roots, a high level of resistance to stress, resistance to disease, and/or improved nitrogen use efficiency, all mediated by an improvement or maintenance of photosynthetic efficiency. All of this is consequently translated to substantially enhanced yields in the hands of the user and the capabilities of the technology to deliver this value.

The technology is built upon many years of selection of strains and evaluation of mechanisms of the abilities of our microbial agents to enhance plant performance. Many thousands of strains have been identified and selected, but only a few are used commercially. In some embodiments, the selected agents of the present invention rapidly colonize roots from seed treatments and grow and proliferate asymptomatically in the root cortex. They do not colonize the remainder of the plant, but in their niche in the root, they initiate chemical communication with the plant that results in induction of systemic changes in the plant that are beneficial, including upregulation of entire pathways. In this way, because plants exposed to stresses produce large quantities of toxic reactive oxygen species (ROS) and ROS are even produced as by-product of over-excitation of photosynthetic pigments, the systemic changes in the plant include upregulation of the entire set of proteins involved in reduction of ROS to nontoxic forms. This results in an improved internal redox environment (OIRE) in the plant that is maintained and that is responsible both for overcoming effects of stresses and that increase photosynthetic efficiency. The organisms also induce enhanced levels of photosynthetic elements.

These endophytic microorganisms frequently are fully symbiotic with plants (Harman, Howell, et al., 2004). These endophytic symbionts have abilities to induce multiple beneficial effects in plants, including induced resistance to diseases and potentially other pests; resistance to abiotic stresses such as drought, salt and flooding; improved efficiency of uses of nitrogen and other plant nutrients; enhancement of seed germination and seedling vigor; and enhanced plant growth and development. There are numerous diverse genera of microbes that induce at least most of these changes in plant performance, including mycorrhizae, plant growth promoting rhizobacteria, and Basidomycetous fungi in the Sebaciles such as Piriformaspora indica. These organisms have an endophytic versus a plant pathogenic life style (Shoresh, Mastouri, et al., 2010) typical of numerous other plant-associated microorganisms. The systemic changes in plant gene expression are presumed to be induced by the production of specific triggering metabolites from these different organisms. These metabolites must be different from these diverse organisms, since they effective organism are very distantly related, and some are even in different kingdoms, so it is unlikely that the same specific pathways of gene expression upregulation and even the specific plant genes upregulated are the same. A number of microbial metabolites with that are strongly active in altering plant phenotypes at low concentrations (<1 µmolar) have been identified; e.g., lipopeptides from *Bacillus* spp. (Cawoy, Mariutto, et al., 2014, Debois, Fernandez, et al., 2015), and hydrophobic proteins (Djonovic, Vargas, et al., 2007, Ruoccco, Lanzuise, et al., 2015) and volatile and nonvolatile metabolites from *Trichoderma* spp. (Vinale, Sivasithamparam, et al., 2008). Applicants have discovered that, at very low concentrations, 1-octene-3-ol (mushroom alcohol), a metabolite of *T. afroharzianum* (formerly *T. harzianum*) and other species (Hung, 2014), strongly enhances plant growth and is highly effective in induction of plant disease resistance.

Beyond this, Applicants examined a collection of sixty eight *Bacillus* spp. isolated from plant parts or roots for their abilities to qualitatively induce the same positive responses in plants that the selected strains of *Trichoderma* do. Their abilities were assessed to induce increases in plant growth and to confer disease and stress resistance. Strain As2 from alfalfa stems (*B. amyloliquifaciens*) was a strongly performing strain. However, as noted above, *Bacillus* spp. cannot produce the same metabolites or affect plants via the same mechanisms. For this reason, Applicants combined strains of *Trichoderma* with As2. In addition, Applicants developed humate-based formulations for maximum efficacy, since a major goal of this project was to develop new combinations/formulations that provided superior performance to the current commercial product SabrEx. This gave the formulations used in 2015, and that were highly effective.

A practical component of this study was to evaluate the current commercial product, SabrEx (composed of strains K2 and K4), and to develop seed treatments products that improved on the capabilities of this product. The development of the strain or metabolite mixtures used in this study was based on the concept of focused microbial diversity ("FMD"). FMD has the following components: (1) microbial strains each individually are rhizospheric and endophytically competent. In addition (2) Applicants expect that metabolites are the specific triggers of changes in plant gene expression, so the concept of FMD also includes the triggering compounds. FMD thus requires metabolites that give benefits for a period of months (metabolites) or at least a season (microbes) and strains or metabolites that are effective when added as seed treatments at levels of about 70 mg/ha (microbes) or at less than 1 µl/seed (metabolites). Effective strains, metabolites or mixtures of the two are then combined into single treatments that are expected to provide better results than any of the components used singly. Since each component is strongly able to colonize plant roots and become an integral and long-lasting component of the plant (microbes) or to have long-term effects (both microbes and metabolites), Applicants anticipate substantial and beneficial changes in the plant phytobiome that lead to long-term benefits to plant performance.

Initially, these organisms and metabolites were implicated in enhanced resistance to plant diseases. However, the capabilities of both microbes and metabolites have recently been shown to have much wider ranges of action. For example, *Trichoderma* spp. have been demonstrated to improve seed and seedling performance of aged seeds and to induce resistance to stresses such as water and drought stress (Mastouri, Bjorkman, et al., 2010, Mastouri, Bjorkman, et al., 2012). In both of these cases, alleviation of these diverse stresses are due in large part to amelioration of the toxic and negative effects of reactive oxygen species (ROS) that accumulate in plant under stress. In drought or salt challenged plants, levels of antioxidants in plants (ascorbate or glutathione) were unchanged but the ratio of reduced to oxidized forms increased in plants whose roots were colonized by *T. afroharzianum*, while the ratio decreased in plants under stress not containing the organism. The highest ratio was when both stress and the fungus was present. Moreover, both levels of enzymes catalyzing the cycling of oxidized to reduced forms of the antioxidants and expression of the genes encoding the enzymes all increased. Finally, the presence of the fungus reduced the toxic effects of methyl viologen, which strongly induces ROS formation. Thus, the effects of the fungus in part act as an agent to optimize ROS levels in plants.

If so, then there is a strong likelihood that the agents also can enhance or maintain photosynthetic efficiency in plants. All of these improvements in plant performance noted above are energy intensive, and for specific microbes to induce these changes, the plants also must have improved photosynthetic efficiency (Shoresh and Harman, 2008). In support of the concept of an improvement in the basal level of photosynthesis are the following: there are many reports of enhanced leaf greenness as a consequence of inoculation with microbial agents (cf. (Harman, 2000). This is evidenced by results of gene expression and/or proteomic studies that demonstrate that photosynthetic elements are among those overexpressed. These include rubisco and photosystem II oxygen evolving complex protein (Shoresh and Harman, 2008, Vargas, Mandawe, et al., 2009). If photosynthesis is enhanced, then available resource such as starch should also be increased and this does occur (Shoresh and Harman, 2008). Substantiating the expectations that these changes directly affect plant photosynthesis was the demonstration that a strain of *T. virens* resulted in an increase of carbon sequestration in corn more than 60% (Vargas, Mandawe, et al., 2009).

Moreover, photosynthesis and photosynthetic machinery are highly susceptible to damage by reactive oxygen species (ROS). Stresses such as drought, salt, and flooding result in accumulation of levels of ROS that are highly damaging to them (Nath, Jajoo, et al., 2013). Even other otherwise optimal growing conditions, light in excess of its utilization in photosynthesis result in production of ROS, including the superoxide anion, that are detrimental to pigments, proteins and lipids.

Therefore, damage to photosynthetic systems occurs as a consequence of ROS accumulation that may be induced by stresses or even by otherwise optimal conditions at high light levels. This is of serious consequence, since photosynthesis is therefore the ultimate limiting factor in the growth of plants. Unfortunately, the best measured photosynthesis is only about 20% of the theoretical maximum conversion rates (which are 0.1 and 0.13 for C3 and C4 plants) and this has not noticeably improved through plant improvement efforts. To put it another way, yields have increased without improving the photosynthetic rate, which is the fundamental limiting factor (Long, Marshall-Colon, et al., 2015). The rate of increase in yield improvements of major crops has decreased in recent years, in part because the other inputs and improvements are becoming limited by the lack of improvement in photosynthetic efficiency (Long, Marshall-Colon, et al., 2015).

Yield potential (YP) of crop plants can be approximated as the product of the solar radiation received over the unit of land in a single growing season (Q), the efficiencies of the plant to intercept the radiation (E1), conversion of radiation energy into biomass energy (E2), and partitioning of the biomass into the harvestable parts of the plants (E3) (YP=Q·E1·E2·E3) (Long, Marshall-Colon, et al., 2015).

Modern developments in plant improvement, as exemplified by advances in the green revolution, have focused primarily on E1 and E3, while E2, a trait not easily evaluated in most breeding programs, has not been targeted. E1 is the proportion of available light intercepted by plant stands and is currently around 90%, while E3 has been improved by selecting varieties that convert more of their biomass into harvestable product rather than total biomass. For wheat, improvements in E3 were accomplished by semi-dwarfing genotypes that reduced the amount of biomass allocated to the stem relative to that incorporated into the grain (Long, Marshall-Colon, et al., 2015). For corn (maize) E3 was enhanced by genetically limiting the number of ears per plant to one of a genetically predetermined maximum size, even though some genotypes have the potential to produce more ears/stalk or larger ears. The development of E3 strategies has been primarily to provide the greatest yields in plants where photosynthate is the primary limiting factor. For crops where maximum biomass is required, such as sugar cane and corn for silage, the need for improvement in E2 is particularly important. Further, if E2 was improved some of the standard dogmas of plant breeding—e.g., only one ear/stalk of corn, E3 strategies may be less desirable than is the case currently. Other E2 strategies are more common for field corn; ears may be determinate (of fixed size and one ear per stalk) or semi-flex or flex (ears are able to increase in size in response to additional plant resources, primarily photosynthate).

These data imply or indicate that both abiotic stress resistance and enhanced functional photosynthetic efficiency can be improved in crop plants by maintenance of an optimized redox potential in plants. This can occur through the ability of selected strains of *Trichoderma* spp. to colonize roots, and induce systemic changes in plant gene expression especially in the pathways and enzymes involved in antioxidant cycling and detoxification of reactive oxygen species such as the superoxide anion (Mastouri, Bjorkman, et al., 2012). This requires coordinated upregulation of the entire gene sets involved in these reactions (Mastouri, Bjorkman, et al., 2012).

Thus root colonization by selected strains of these fungi are expected to have numerous advantages to plant performance, including all of those noted earlier. The ability of the strains to ameliorate ROS to nontoxic levels is anticipated to have numerous benefits and these would be expected to result in improved plant performance and yield enhancement in the field.

Moreover, based on earlier observations and in analogy with induced resistance to pathogens, Applicants suggest that resistance to stresses such as drought are likely to involve gene priming events; i.e., where genes expressed more rapidly and at higher levels after a stressful event. These genes are poised for activity, perhaps through specific histone modifications to specific genes in the chromatin (Jaskiewicz, Conrath, et al., 2011).

Further, Applicants anticipate that the capabilities of these organisms to improve at least field level photosynthetic efficiency (functional photosynthesis efficiency ("FPE")) may provide a greater reservoir of biomass energy (photosynthate) to plants. FPE is defined as the avoidance of loss of the already-low levels of photosynthetic efficiency due to ROS levels induced by stresses or even high light intensity.

Of course, it may also be that not only FPE can be attained, but also total photosynthetic efficiency ("TPE") can be improved, as suggested by the observation that the presence of a strain of *T. virens* resulted in a 69% increase in photosynthesis rate in corn (Vargas, Crutcher, et al., 2010). If improved levels of biomass energy are available through FPE or TPE induced by endophytic fungi, then it is possible that yields of important crops can be markedly improved. However, if plant productivity levels are limited by E3 strategies, i.e, matching of yields to currently expected levels of photosynthate, then alternative E2 strategies may be useful that have not been heretofore practical. Clearly, the genetics of plants are important in their response to plant symbiotic microbes, especially in determination of plant yield responses.

All of these strategies and alternatives have the potential to positively affect the environment. For example, FPE or TPE have the potential to increase carbon sequestration, and the organisms also enhance nitrogen use efficiency ("NUE") and thereby reduce the important greenhouse gases CO2 and NO. In addition, greater NUE is likely to reduce water pollution from NO3 and NO2 from runoff from fertilized fields (Harman, 2011). If this potential is being realized, then greater total incorporation of C and N should be present in harvested biomass. Clearly, if greater levels of C or N are sequestered or incorporated into crop plants, then they are not present in either the atmosphere or waterways. The impact of annual crops on these environmental factors has not been seriously considered with annual crops because sequestered C or N are rapidly cycled back into the environment as the plant products are harvested and used. However, this does not take into consideration the biomass in roots, which is large and increased by the changed phytobiome that results from use of these organisms. The C and N contained within root biomass is slowly degraded and the organic materials and incorporated into organic materials in the soil. Thus, the soil become a reservoir for both of these elements and, with larger root systems, soil organic material, and therefore soil tilth and productivity, can be enhanced. Yield and photosynthesis interact strongly with nitrogen available to the plants. This study also examined the interaction of different corn varieties with nitrogen uptake.

Accordingly, there are numerous applications of the present disclosure as follows: (i) feeding a hungry world. The world population is expected to grow to about 9 billion persons by 2050, up from 7 billion now, and yields of major crop products will need to increase to meet this need (Taylor, 2015). The proposed research describes the potential of a significant alteration in the phytobiome of corn that has potential to improve the fundamental photosynthetic capability of this crop that will result in significant yield improvements. Moreover, while this project is primarily directed to large agbio in the developed world, the basic technology is appropriate also for small growers in the emerging nations; and (ii) addressing levels of greenhouse gases in the atmosphere. In 2010, there was a net increase of about 33 billion tons of CO2 in the atmosphere, which is contributing to global warming. Recently, a group of business leaders has called for net-zero increases in this gas in the atmosphere.

To meet this goal, not only do emissions need to decrease, but methods for removal of CO2 need to be implemented. The proposed research envisions a system which can remove up to 91 t/ha of CO2 via photosynthesis. Annual crops have not been considered as candidates for sequestration and removal of this gas from the atmosphere because the crop is utilized and CO2 re-released into the atmosphere. However, only about 50% of crops are typically ever harvested, while the roots and other subterranean tissues are located in the soil, where they gradually decompose and are converted into organic matter in the soil. The proposed technology has been demonstrated to increase root biomass (up to doubling) with plants grown from treated seeds. This results in the soil becoming a reservoir of sequestered carbon and also results in an increase in organic matter in the soil, which results in more productive soils with higher tilth. Beyond this, the proposed technology increases the abilities of corn plants to take up nitrogen, and this can result in decreases of leaching of nitrates and nitrites into the ground water, and to decreases in nitrous oxide release into the atmosphere. Nitrates and nitrites are potent polluters of waterways and nitrous oxide contributes to global warming. Thus, the changes induced in corn can make them part of the solutions to global warming and water pollution rather than being part of the problems.

The present disclosure further provides for farmer-applied products and/or treatment of seeds by seed treatment or seed companies so that farmers get an in-the-bag solution, where the direct application by farmers and attendant variable application, can be modified and/or avoided.

The present disclosure further provides for control of nematodes. Nematodes are roundworms that feed in a variety of ways on crop plant roots. By doing so, they adversely affect plant growth and yield. They impair the total amount of root tissue, thereby lessening the root surface area available for nutrient uptake and other essential functions of the plants.

Thus, if agents or methods are in place to increase root area and mass, the effects of nematodes on overall plant function will be reduced. This has been shown earlier in experiments with a rhizosphere competent strain of *T. afroharzianum* (T22). Application of the organism increased while root rot nematodes reduced root surface area. Addition of the microbial agent minimized or abolished the effects of the nematodes, although there was no evidence for direct control of them (Harman and Shoresh 2007). This example demonstrates that agents or systems that improve root growth will provide tolerance to damage.

In addition, nematodes may be directly controlled by the agents, as is further described herein. This control may be demonstrated by a reduction of the nematodes around plants, or as by reduction in their egg laying, which minimizes populations of the destructive worms. Control can occur through (a) direct effects of the agents or systems on the worms (e.g., by antibiosis or parasitism), or (b) through changes in plant components induced by the agents or systems that makes the roots inhospitable to the nematodes. This inhospitability may occur by different systems ranging from changes in nutrients available to the feeding roots or to the presence of plant metabolites that make the roots less nutritious or actually toxic to the worms. If changes in plants are responsible for control, this may be translocated to portions of roots not directly exposed to the biocontrol agents or systems.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 1 is a picture of greenhouse tested models of FMD. FIG. 1A shows plants of one variety of corn treated with nothing (chemical seed treatment only), SabrEx, a mixture of K2, K4 and As2 and K5As2. FIG. 1B shows plants of same variety with the chemical seed treatment only (same plant as at the one at the left of FIG. 1A and with a formulation containing a low level of a metabolite of *Trichoderma*).

FIG. 2 is a graph showing data from nematode control experiments.

DESCRIPTION OF THE PREFERRED EMBODIMENTS

Figure 3A:
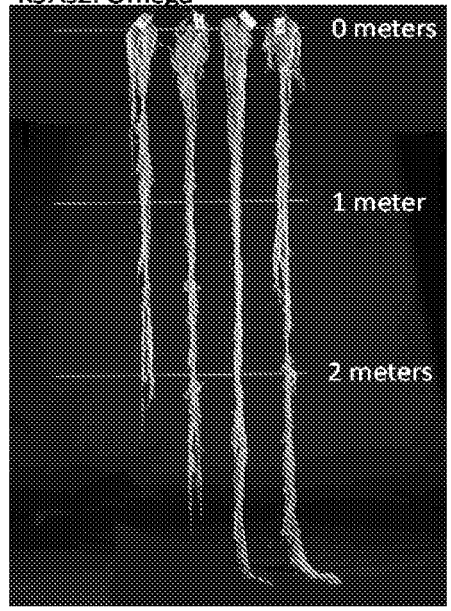
FIG. 3A is a picture showing enhanced root growth of corn grown in a PVC pipe.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read together with the specification, and are to be considered a portion of the entire written description of this invention.

Overview.

Applicants have investigated the uses of many new microbial agents including fungi in the genus *Trichoderma* and bacteria in the genus *Bacillus*. Some of the uses that have been identified are for plant growth promotion and yield enhancement, while other uses are for pest control. Many strains and formulations have both types of functions.

All of these developments are made possible through the concepts Applicants have developed in Smart Selection™ and Focused Molecular Diversity™. Smart Selection requires (a) the inclusion of endophytic strains of microorganisms that provide season long benefits to plants, (b) a knowledge of the mechanisms of action, especially of the ability of the strains to induce systemic alteration of gene expression/ability to cause benefits throughout plants, and (c) efficient screening methods that provide good applicability to the field. Focused Molecular Diversity is the concept that we can introduce specific microorganisms (usually endophytic) to replace or enhance the microbial community that ordinarily would exist with organisms that we add and that provide plant benefits that otherwise would not occur. It is augmented by the ability to create formulations that allow the organisms (or metabolites) selected through Smart Selection or Focused Molecular Diversity to function and persist in agricultural practices.

This results in plants that have (a) enhanced resistance to disease, (b) markedly enhanced resistance to abiotic stresses such as drought, salt, flooding and others, (c) bigger and deeper roots, (d) increased abilities to utilize nitrogen and other fertilizers, and (e) enhanced seed germination (Harman, Cadle-Davidson, et al., 2015, Mastouri, Bjorkman, et al., 2010, Shoresh, Mastouri, et al., 2010). The coordinated up-regulation of entire pathways are critically essential. Among the most important changes is an increase photosynthetic efficiency; all of the other changes are energy-dependent and without an increase in photosynthate (energy) none of the other changes can occur. The concepts underlying the induction of stress resistance in plants are unique.

The capabilities of Applicant's seed treatments with FMD gave plants as shown in FIG. 1. In FIG. 1A, plants of one variety of corn treated with nothing (chemical seed treatment only), SabrEx, a mixture of K2, K4 and As2 and K5As2 is shown, while FIG. 1B shows plants of same variety with the chemical seed treatment only (same plant as at the one at the left of FIG. 1A and with a formulation containing a low level of a metabolite of *Trichoderma*. The metabolite was applied only to the seeds at less than 1 μl/seed, but caused season-long effects, by epigenetic effects. As predicted from greenhouse testing, both above ground plant parts and roots were larger from the microbial or metabolite seed treatments, yield of grain and silage was increased by more than 10% and C sequestration (a measure of photosynthetic efficiency) and N uptake (a measure of N use efficiency (NUE) were increased. All values were significant from these replicated plots and the results were replicated over five separate varieties.

These results are therefore the result of the integration of systems biological approaches that begin with identification of superior strains in the laboratory, continue through predictive greenhouse evaluations, and that are a component of testable and predictive models that have largely been shown to be correct.

Systems and Observations Reaching Commercial Stages.

Many of Applicant's strains have multiple functionality and, as an example of this versatility, Applicants present data on one such strain, with reference to others that are appropriate for the purpose. Information on the stage of development of these strains and formulations relative to them are provided for each application.

Nematode Control.

Experiments were contracted with Nemalab, Durbanville, SA, as follows and shown at FIG. 2 herein:

Tomatoes were grown for a 6-8 weeks and then the stems were split and the resulting plant had two separate root systems but a single shoot.

Each of the two roots were separately placed in potting soil/separate pot.

One pot was treated with a microbial strain plus nematodes and the other side contained only nematodes. Data on nematode control was taken 45 days later.

The purpose of this system was to measure direct control of nematodes by contact with the biocontrol agents versus control via systemic resistance conferred by the contact of the biocontrol agents plus nematodes. Results of nematode control is reported with the two root systems as treated pot vs systemic pot.

This experiment is another validation of the model based FMD and shown above. The only way that the roots without the biological treatment can be protected from nematodes is via systemic induction of resistance, this time for control of nematodes. There were ten other microbials and microbial combinations evaluated, and only two others gave results comparable to those shown herein.

Experiments were conducted on tomato with *Meloidgyne javacina* (plant pathogenic nematodes) on tomato.

There were six replicates per treatment.

The experiments were designed to indicate whether control was of an induced systemic nature or direct effects of the strains on the nematodes. Data shown therefore is for the systemic effect (i.e., nematodes applied but *Trichoderma* not applied to that root side) versus direct effects (i.e., both nematodes and the agent applied to the split root in question). Data is shown in the accompanying graph in FIG. 2. In every case, the implied comparison of the water (nematode only) control and the treated roots or systemic roots is statistically significant. The data suggest that the biological agent reduced all parameters measured, and did so on roots where the agent was applied directly with the nematodes and on the other root, where only nematodes were applied.

This data indicates a high degree of systemic resistance that can be transferred to plant portions where the biocontrol organism is not added. The galling index was reduced and it must be noted that the reduction of galling is not linear, so the decrease is probably underestimated. Egg numbers were reduced very greatly, to almost zero, even though the numbers of female nematodes were at less reduced numbers. This suggests that, even though female nematodes were present, they were incapable of reproducing. Other strains and strain combinations were about as effective as K5, although some were much less effective.

In the above tomato plant experiments, nematode growth and reproduction occurred in root portions not exposed to the agents, thus demonstrating that this system was operational in tomato roots tested. This experiment is not determinative if, in addition, there was also direct effects of the agents where the agent and nematodes were present together. Further experiments have now shown such effects.

In this disclosure, Applicants provide the following:

Enhanced season-long root development in corn (expanding upon the information in the co-terminally filed U.S. provisional patent application No. 62/479,080 entitled "Coating materials for seeds and particulate materials, including fertilizers, to enhance plant growth and productivity.")

High levels of efficacy of nematode control on corn and soybeans, as well as increasing the range of efficacy to the following nematodes on corn: root lesion nematodes=*Pratylenchus* spp.; spiral nematode=*Helicotylenchus*, but it is also sometimes applied to other genera in the family Hoplolaimidae including *Rotylenchus, Aorolaimus, Scutellonema,* and *Peltamigratus*; Dagger nematode=*Xiphinema*; these nematodes transmit viruses; Lance nematode=*Hoplolaimus*; these insects are damaging to field crops, but even more so on turf, and on soybeans the soybean cyst nematode=*Heterodera glycines*.

Figure 3B:
FIG. 3B is a picture showing enhanced root growth of corn grown in the field.

Demonstration that control on different plants occurs in the field as well as in the greenhouse. Applicants also include definitive field results with corn and soybeans. FIGS. 3A and 3B show pictures of enhanced root growth in corn in both PVC pipes (FIG. 3A) and in the field (FIG. 3B).

Figures 4A, 4B:
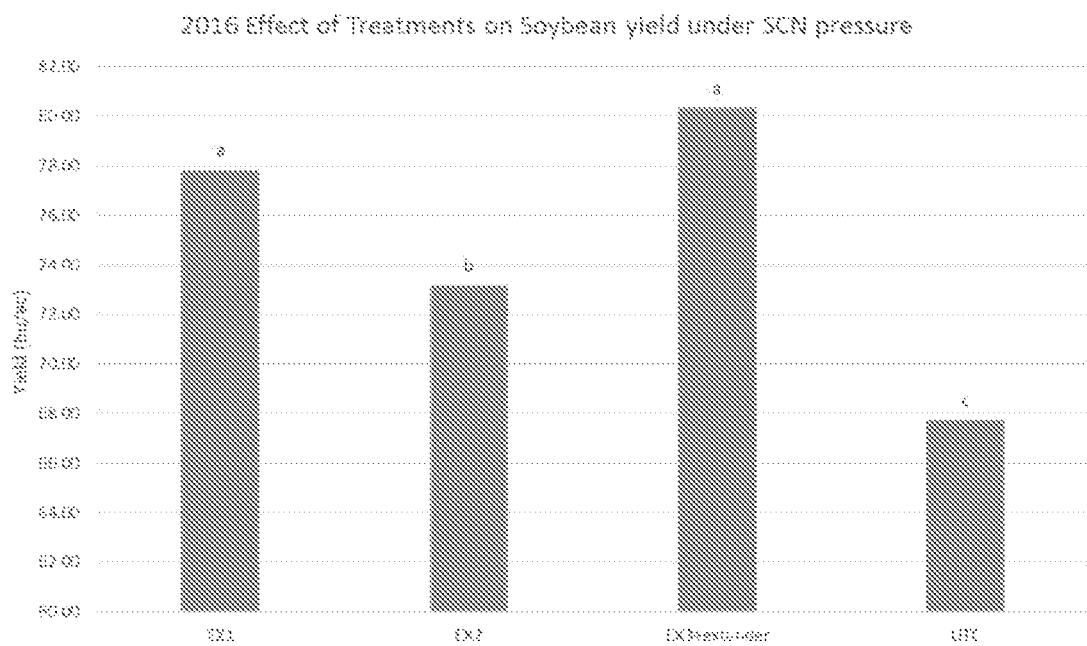
FIG. 4A is a table showing seed treatments that were applied to soybeans.
FIG. 4B is a graph showing the effects of treatment of soybean yields.
Figure 4C:
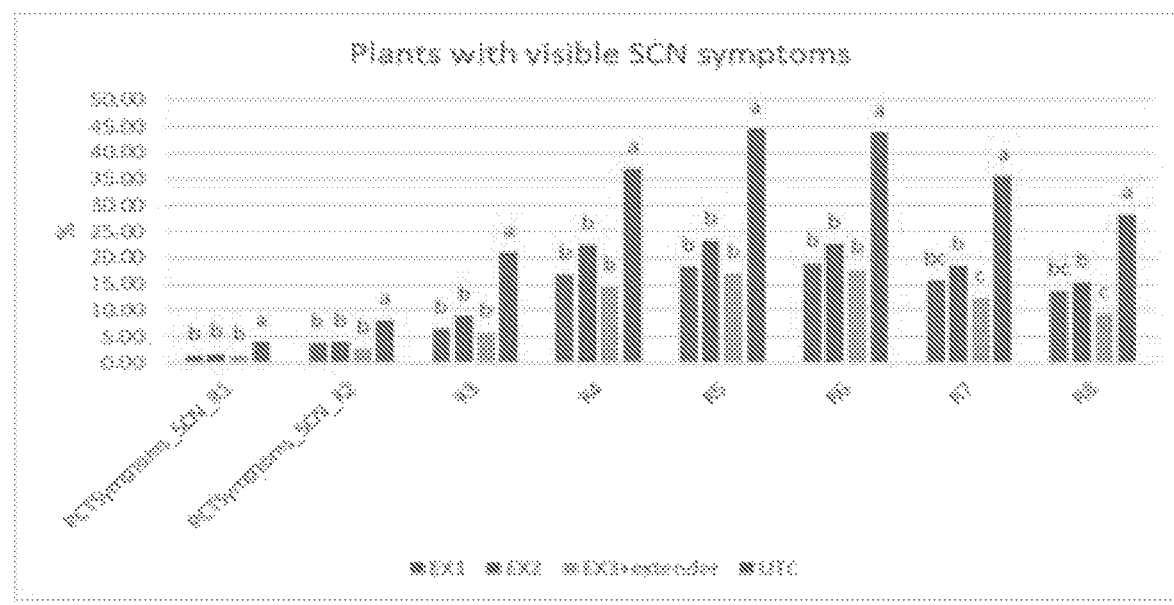
FIG. 4C is a graph showing plants with root systems at different stages of development.
Figure 4D:
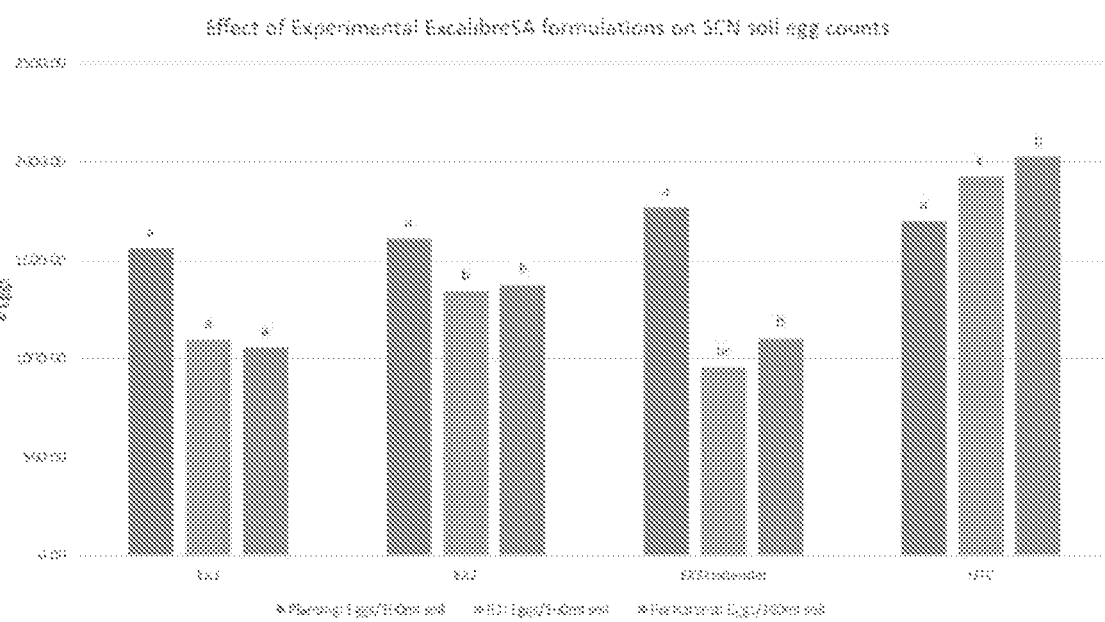
FIG. 4D is a graph showing the effect of seed treatments on nematode soil egg counts.

FIGS. 4A-D show results involving the control of nematodes for soybeans in field trials in Wisconsin in the summer of 2016. FIG. 4A is a chart showing the specific seed treatments that were applied. FIG. 4B indicates the yields generated with each treatment. FIG. 4C is a chart showing plants with root symptoms at different stages of development. FIG. 4D is a chart showing the effect of these treatments on soil egg counts.

Figure 5A:
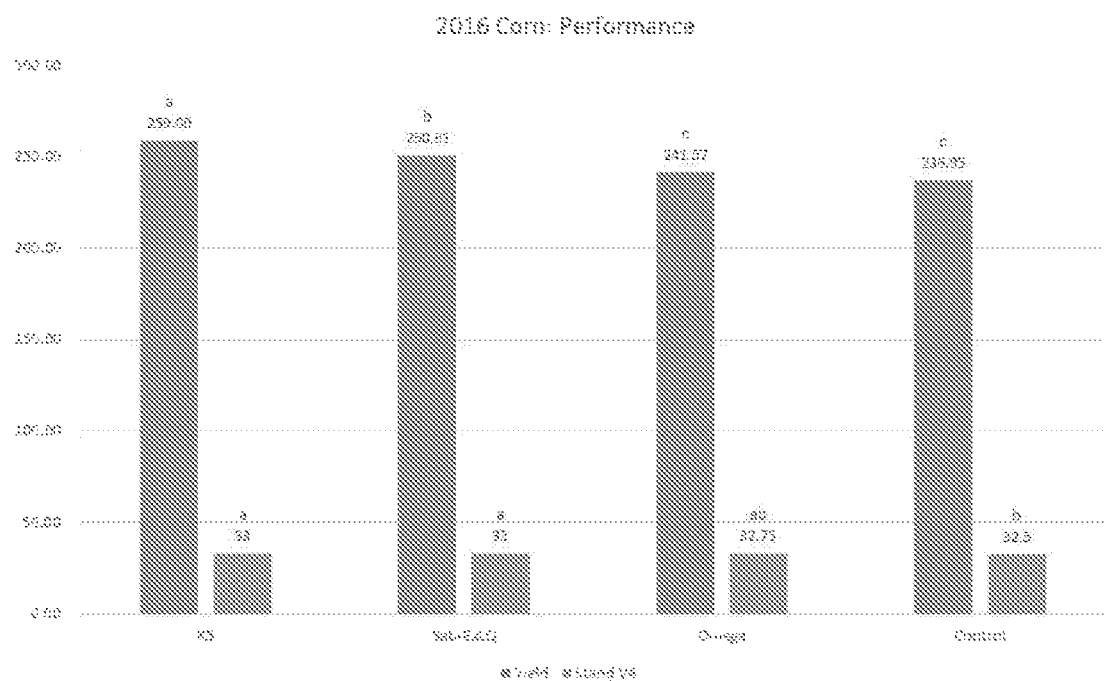
FIG. 5A is a graph showing stand establishment and yield of field-planted corn that were treated for nematode control.
Figure 5B:
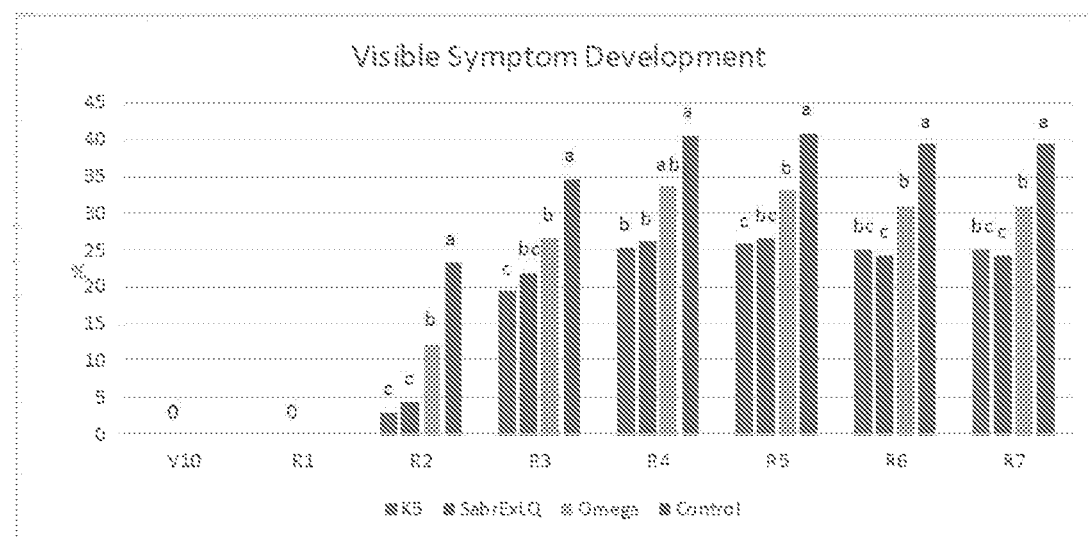
FIG. 5B is a graph showing plants with visible root symptoms at different stages of development.
Figure 5C:
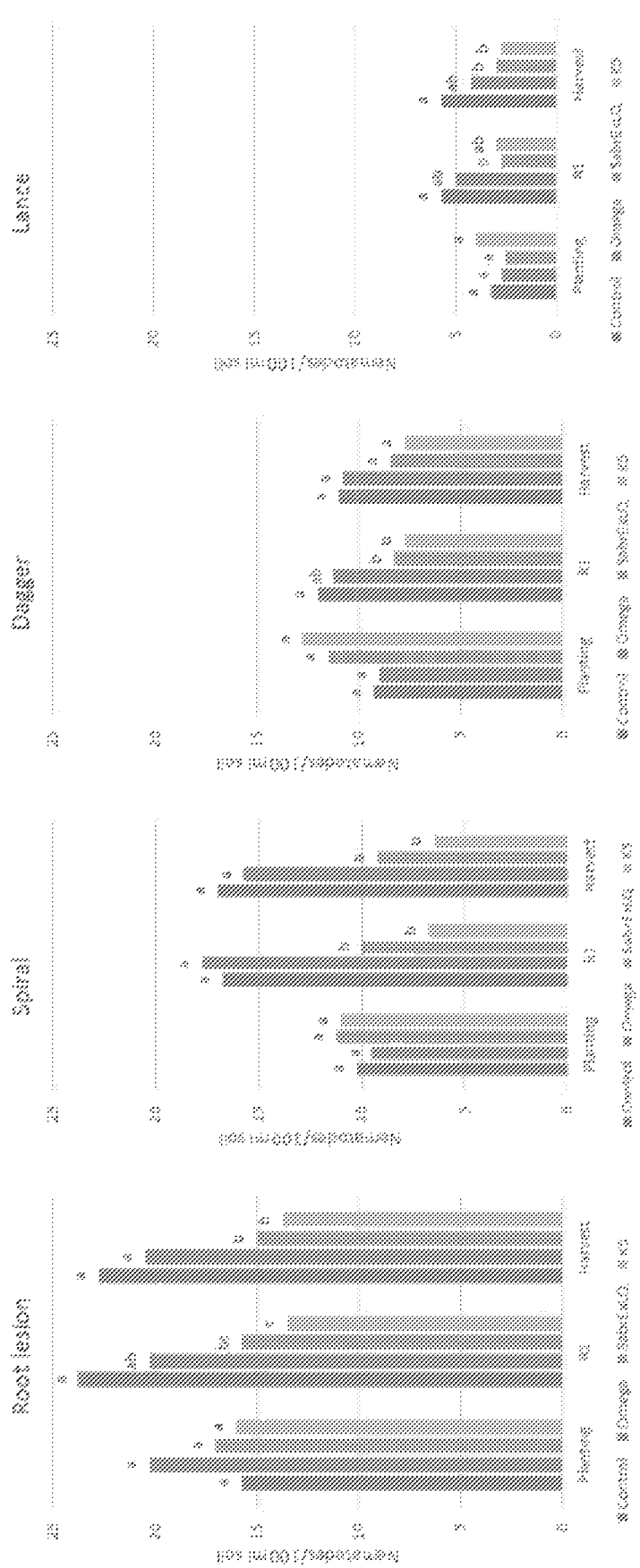
FIG. 5C is a graph showing overall nematode numbers by type.

FIGS. 5A-C show results involving the control of nematodes for corn in field trials in Wisconsin in the summer of 2016. Seeds were separately treated with Omega (1-octene-3-ol), SabrEx, K5, and a control (chemical seed treatment only). FIG. 5A is a chart showing stand establishment and yield. FIG. 5B is a chart showing plants with root symptoms at different stages of development. FIG. 5C is a chart showing nematode numbers by type.

Control of Aphids Using Foliar Treatments.

Figure 6:
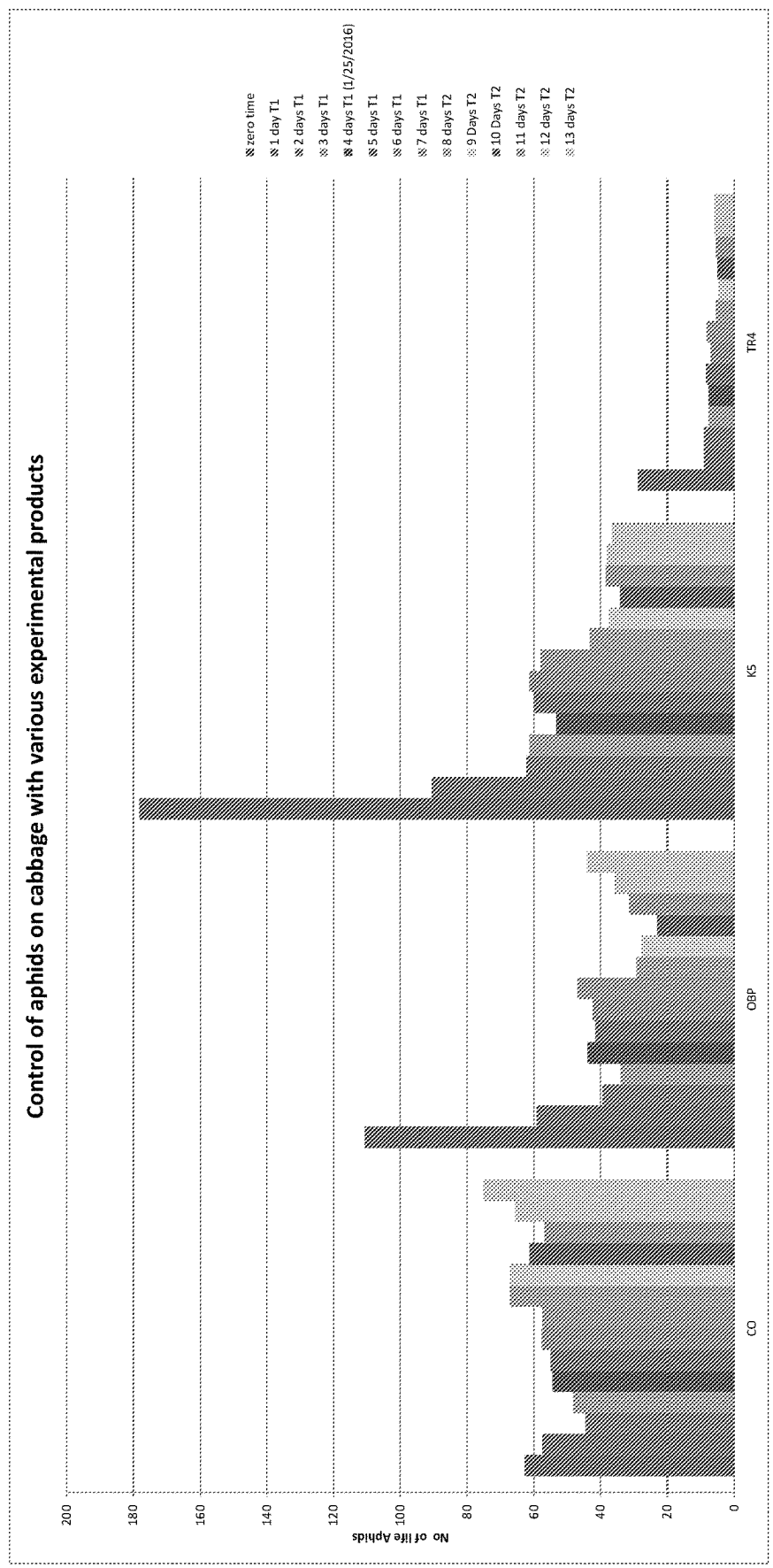
FIG. 6 is a graph showing data from experiments showing control of aphids using foliar treatments.

Applicant's systems that are composed of selected strains and development of formulations have proven effective in the control of aphids, as shown in FIG. 6, and similar treatments also are effective on white flies. The graph in FIG. 6 provides results in greenhouse cage experiments on cabbage. In each case, results were from counts on individual plants considered as replicates, but all the plants were contained in the same cage. This was necessary to avoid transfer of the winged forms of the aphids between treatments. Consequently, the starting point in aphid numbers varied between the treatments, so the change over time is the important parameter.

Three of a number of treatments are shown in FIG. 6. The control was on plants treated with aphids only. All of the other treatments contained Applicant's proprietary adjuvant organic pesticide base ("OPB"). This material is suitable for organic certification and contains an OMRI listed surfactant as well as other materials. It forms highly stable emulsions for spray application; typically Applicants add 3-6 ml of the concentrated OPB per liter of water used for applications. By itself, OPB has insecticidal properties. The two microbial strains shown in the example are K5 (added in the OPB-based formulation) and *Bacillus amyloliquifaciens* strain TR4, also added with OPB.

In the experiment having results shown in FIG. 6, spray applications were made on day 1 and day 7, and numbers of live aphids were counted daily. In the data shown, there was no effect in aphid numbers in the control (water-only) spray, but with OPB and OPB+K5, numbers were immediately and significantly reduced and remained at a fairly low levels throughout the experiment. However, numbers with OPB+ TR4 were significantly lower. In Applicant's experiments, OPB is necessary as adjuvant both for its insecticidal activity and because it allows wetting and potentiation of the microbial agents. In this case FMD is an effective tool, but the most effective strain TR4 is different from those identified in root studies.

Enhanced and Improved Formulations of Biological Agents as Seed Treatments.

Microbial agents have greatly untapped potential to improve agricultural productivity and profitability. However, they have some potential issues that can reduce their acceptability in agricultural practices. Two of the more important (and sometimes overlooked) factors follow. First, for agricultural practices, especially for seed treatments, but other applications as well, currently have chemical pesticides as components. These frequently are toxic to microbial agents, either through direct effects of the active ingredients or through toxicity of the adjuvants in chemical formulations such as surfactants and the like. Applicants have shown repeatedly that one can add biologicals to seeds already treated with a chemical with good efficacy, even just after the chemical is applied. This can be accomplished with a separate tank on the seed treater for the biological, but this has proven inconvenient, which limits sales of our products. To overcome this issue, you need to be able to mix biological agents directly with the tank mix with no separate tank. Beyond this, some potential users would like to be able to make a direct 'in can' system in which the disclosed biologicals are fully compatible with the concentrated pesticide for extended periods of time.

Second, seed treatment and other agricultural application equipment frequently contain elements that impose high shear forces upon microbial cells. These may easily disrupt the cells, a fact that many or most biological agent manufacturers ignore. Nevertheless, recent advances by the Applicants in microbial formulation have overcome many of these objections. For evaluation of new systems, Applicants worked with a commercial pesticide mixture that contains three fungicides and an insecticide. It also contains a colorant, and high levels of surfactants and emulsifiers. Each of these components can be lethal to *Trichoderma* spores; if spores themselves with no added protection are added to this mix, they are killed instantly. Applicants considered that the only possible solution to provide compatibility is to create systems in which the spores are physically separated from the pesticide. Initial steps were on a macro scale, but the desired outcome required a physical mixture of the pesticide and the biological agent, at least at the tank mix level.

Shelf Life of New Formulations in Pesticide.

Applicants have been successful in creating new formulations that are compatible with the chemical pesticide. Novel encapsulation/formulation systems allow the disclosed *Trichoderma* strains to retain full viability three weeks after mixing. To reiterate, without the formulation advance, the biological agents are killed immediately upon contact. Three weeks allows full chemical compatibility of our formulations with chemical pesticides at least in tank mixes. Three weeks does not give a full in-can solution, but the advances made suggest that such a goal is within reach. The new system also allows seeds to be treated with the Hege spinning disc system, demonstrating the compatibility of the new formulation with high shear forces. Compatibility was demonstrated by direct planting of seeds and by dilution plantings after seed washings.

Efficacy of Pesticide-*Trichoderma* Combinations.

Data is given for root weight; shoot weight and stand establishment follow the exact same pattern. Data is from greenhouse tests with four replicates per treatment and shown in FIG. 7. The results of the planting in infested soil verify the results reported above for protection of seeds by K5; these experiments were conducted with K2, but as mentioned earlier, all of the strains have excellent abilities to protect seeds against soil-borne pathogens. The results with K2 (represented by T if the graph in FIG. 7) are, in fact superior to the complex mixture within the chemical pesticide preparation (designated by P; P+T is the combination treatment). This is attributed to the fact that the pesticides protect the seeds only, but the systemic protection afforded by K2 not only protects the seed, but provides longer term protection to the entire plant.

Advanced Microbial Agent Encapsulation Systems for Plant Agriculture.

In accord with the foregoing discussion and details regarding formulations and modality of application, the Applicants appreciate that microbial agents are proving to have substantial utility and capabilities in plant agriculture. However, they must be produced at high levels and with good quality, and they must be formulated both to allow them to be used in chemically-intensive commercial agriculture and to provide adjuvants that enhance the activity of the microbes in plant agriculture. With the exception of organic agricultural production, almost all commercial production is reliant upon chemical fungicides. If biological agents are to reach their full potential and diversity of uses, living microorganisms need to be formulated to allow them to survive and flourish in this chemical environment.

Among the items addressed by the present technology are (i) formulations that permit living organisms to be formulated and survive in harsh chemical environments. This included survival in concentrated chemical formulations; usually to aid in shipping and handling chemical pesticide products are concentrated with the expectation that they will be diluted with water before application; (ii) in addition, many delivery systems for agricultural delivery includes devices designed to apply high shear and gravitational forces to the products. This is an advantage for chemicals where a high degree of particle dispersement and singulation is desirable but it may be lethal to microbial cells where cellular integrity is necessary. Such devices include seed treatment systems where spinning discs or high shear pumping systems are employed; and (iii) in addition, an issue for both biological and chemical agricultural products is high levels of dusting and removal of product from seed surfaces by the use of vacuum planters. This is a particular issue when seeds are treated with some chemical insecticides; the talc dusts from the planter due to the vacuum and the insecticide laced powder it deposited in the environment and it has been implicated as a major factor in honey bee decline.

The present technology also entails a product, GraphEx (see U.S. Pat. No. 9,102,893), that contains talc. Honey bees are not an issue, but loss of product during planting has been a very serious problem. If the product is removed from seeds during the planting process, then the benefits of the microbes are lessened. This problem has contributed to less-than-optimal performance of the product in field situations. To this point, most formulations development of biologicals have focused on aqueous or dry hydrophilic materials. This is reasonable since the organisms themselves are grown in aqueous or at least environments that are quite moist. However, substitution of nonaqueous formulations have advantages in many circumstances. These are defined by the examples that follow.

Examples

Figure 8:
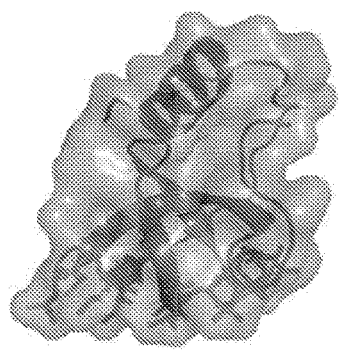
FIG. 8 shows a model of a hydrophobin molecule, where the hydrophobic portion is shown in green.

Preparation of Oil-Based *Trichoderma* Preparations. *Trichoderma* spores frequently contain proteins on their surface designated hydrophobins. These proteins are amphiphilic, in that they contain both a polar (water soluble) end and a nonpolar end (lipid soluble). The properties of these materials are very useful to the present disclosure. See FIG. 8 showing a model of a hydrophobin molecule, where the hydrophobic portion is shown highlighted at the bottom portion of the model (Linder, 2009). Most notably, they assemble on the air/water or oil/water surfaces. As a consequence, if dry spores of *Trichoderma* are mixed with water, they will be suspended in water and will not mix with oil, if an oil layer is applied to the surface. Remarkably, if the opposite process is done, in which spores are suspended in oil, then the resulting spore suspension will not migrate into a water layer if water is overlain on the oil. Thus, stable suspensions in either water or oil are readily obtainable simply by mixing dry spores with either water or oil in the absence of the other. This is a very useful property in preparing formulations of these highly useful microbial agents. In addition, these proteins also are important for the outstanding biological activity of these fungi in plant agriculture. Selected strains of the fungi are highly active both in reducing diseases and other pests and to increase plant growth and yield when properly formulated into agriculturally beneficial formulations (e.g., see U.S. Pat. Nos. 8,716, 001, 8,877,480 and 8,877,481).

Applicant sells an aqueous-based product, SabrEx LQ, that has proven highly useful especially for treating seeds by commercial seed treaters and seed companies. It is very active, only about 6 ml are required to treat sufficient corn seeds to treat about 1 hectare of farm land. However, it may be even more useful to prepare a similar material but with that is oil based. Preparation is extremely easy, dried spores are added to soybean or other oil, but preferably a plant-based triglyceride. Such oils are readily susceptible to degradation by *Trichoderma* lipases and other enzymes, and therefore become a carbon source for the microorganism. Later examples demonstrate wax-based encapsulation will show, and the ability of the microbe to escape an encapsulating material is critical for rapid growth of the organism on the planted seed.

Such oil-based formulations may be advantageous over, for example, SabrEx LQ, which is a suspension of spores in water with a preservative. Advantages include, since the preparations are made with dry spores that have smaller volumes than the fully hydrated ones used in the aqueous-based product, higher potency (colony forming units; cfus) are possible. Second, the shelf life of SabrEx LQ is only about 90 days at room temperature, probably in large part because the high level of hydration allows significant levels of microbial respiration. However, the oil-based formulations are much drier, and so no respiration should be possible. The water activity of the aqueous material is about 0.92 and that of the oil-based formulation about 0.10. However, for oil-based bacterial preparations, different steps must be used since the bacteria lack the hydrophobins on the outer cell or spore wall. These organisms are suspendable in aqueous solutions but not readily in oils. If, however, concentrated bacterial suspensions are added to soybean oil containing about 0.2% lecithin, then a stable emulsion can be obtained and this can be used for further formulations.

Formulation of Chemical Pesticide-Stable *Trichoderma* Preparations.

Large agbio corporations are dominated by chemically-based paradigms. If biological companies are achieve maximum success, they have to adapt to the business and technology models imposed by the chemically-dominated markets and market drivers. The material in question is a typical pesticide that contains three different fungicides, an insecticide and formulations that contain high levels of surfactants, emulsifiers and coloring agents. Hereafter this material is termed pesticide S. If any of the disclosed dry or aqueous-based *Trichoderma* products are added to pesticide S, they were killed instantly. It was considered that the only possible solution was to prevent direct contact of the strains with the toxic solution.

Figure 9:
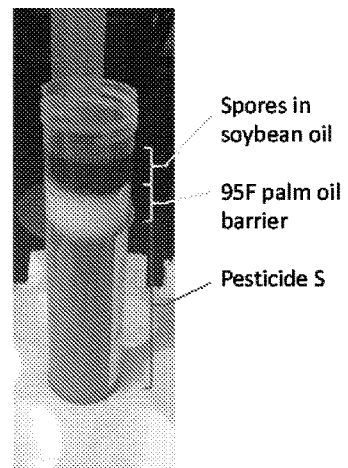
FIG. 9 shows a pesticide (bright red) overlain with a wax barrier (palm oil) that melts at 95 F (36 C). This then was overlain with the *Trichoderma* spore suspension in soybean oil.

The first attempt was to prepare a physical separation as shown in FIG. 9, and that is termed the parfait solution. In this system, the pesticide (bright red) is added, and this is overlain with a wax barrier (palm oil) that melts at 95 F (36 C). This then was overlain with the *Trichoderma* spore suspension in soybean oil described in herein. It is important to note that the relative amounts of *Trichoderma* spore suspension and pesticide S are correct for application to seeds. The pesticide solution is concentrated and is typically diluted 15× for application to seeds, but even so, the volume of the *Trichoderma* solution is less. This is because the *Trichoderma* suspension can be highly concentrated since more dry spores can be added to the oil suspension than if aqueous suspensions are used, and because only a very small amount of *Trichoderma* is used for field seed treatments because the agent colonizes plant roots and may increase up to 10,000-fold within the first few days of seed germination. Thus, the amount added to seeds is only the starter inoculum and most of the growth of the organism is on roots and on developing plants.

This parfait solution conferred stability to the *Trichoderma* spores overlaying the barrier layer. Applicants considered that this might be a viable solution. However, Applicants further considered the addition of the biological agent directly to the pesticide solution. There were two next steps.

The first was demonstration that it is the pesticide base, probably the surfactants, that were immediately toxic. This was shown by microscopic observation that as soon as spores came into contact with the solution, the spores were immediately destroyed, and effect too rapid to be due to the chemical fungicides present in the mix.

The second step was a consideration of the nature of the oil-spore interaction. As indicated above, the hydrophobins on the spore surface interact with the oil, and from the literature and observations, forms a shell around the spore. Thus, there was a reasonable expectation that, if the oil-based *Trichoderma* spore suspensions were mixed with the aqueous pesticide S, there would be formed a "pseuo-encapsulation" of the oil base around the spores that would prevent its contact with the pesticide. This did indeed occur. This step was performed with soybean oil, which at room temperature is a liquid, so the system consists of the spore surrounded by a shell of the liquid oil that is in turn surrounded by the aqueous pesticide S.

A next step was to produce a "micro-parfait" mixture. To accomplish this, rather than using soybean oil as the suspending oil, liquid palm oil or wax at the 36 C melting point was added, and immediately this was mixed rapidly into Pesticide S. This process resulted in a suspension of the wax-encapsulation with small (approximately 5-20 µm) particles with the wax surrounding the *Trichoderma* spores.

This still was not an ideal solution, since the wax probably has too low a melting point to meet all temperature conditions to which the preparation may be subjected. Other waxes, such as bee's wax, cadelilla wax and carnauba wax have higher melting points, up to 86 C. The method described herein to prepare useful microbial products is generally not possible with these high melting point waxes since the microbial agents will be killed by the heat of the molten wax solutions. However, there is a relatively simple method and apparatus to overcome this difficulty.

Figure 10:
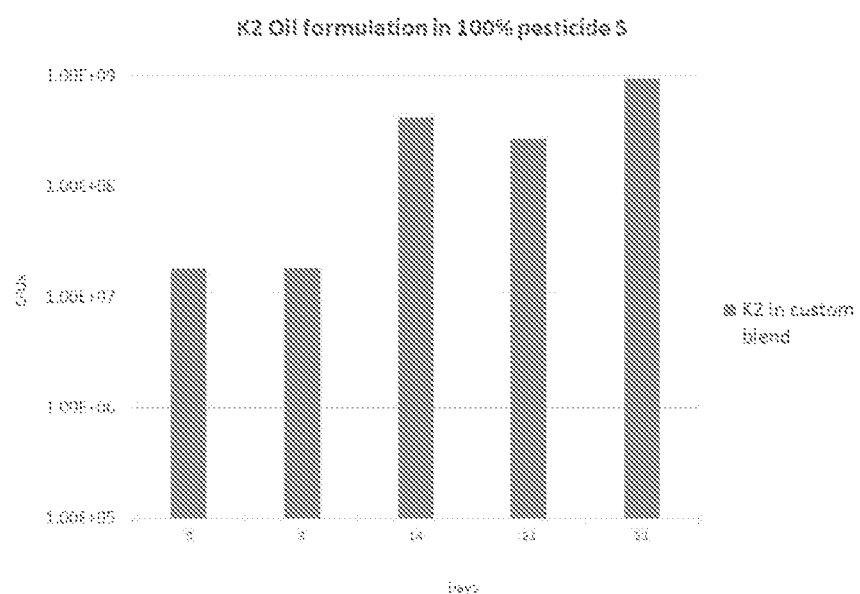
FIG. 10 shows the survival of *Trichoderma* spores in pesticide S in a palm oil encapsulation system.

Buchi manufactures a device that produces encapsulated products, including microorganisms, with a nozzle system. In the preferred embodiment, the hot wax is extruded in the outer shell of concentric nozzles and the material to be encapsulated is extruded in the center nozzle. This gives a liquid encapsulated by a solid wax layer, and this is immediately cooled by expulsion into cold water or alcohol. This encapsulation system avoids exposure of the microbes to the hot wax, or if it is exposed at all, it is for only a second. This system will provide encapsulation of microbes for a wide variety of applications. Even without this system, the palm oil/wax method gave good results. FIG. 10 gives an example.

FIG. 10 indicates that the cfu levels actually increased in the mix. However, this probably is not correct. It is important to note that the original encapsulation contained many particles that contain multiple *Trichoderma* spores. Thus, over time it is anticipated that the surfactants and other materials in pesticide S probably resulted in disaggregation of some of the larger particles, which led to the apparent increase and overestimation. Nonetheless, given that the spores if exposed to pesticide S are immediately killed, the result is excellent.

Figure 7:
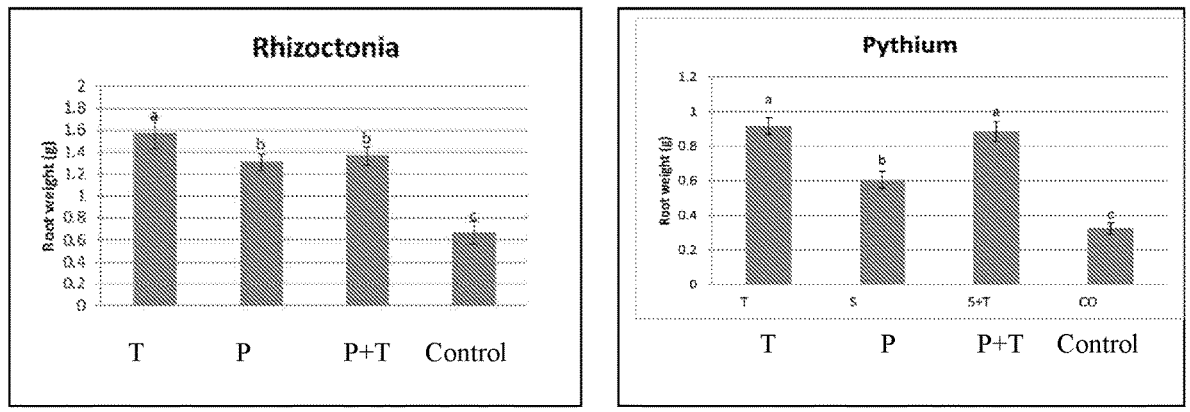
FIG. 7 shows graphs from experiments demonstrating the efficacy of pesticide-*Trichoderma* combinations, where wheat root growth (shoot growth and stand establishment followed a similar pattern following seed treatments).

The biological activity of the new formulations with or without pesticide S is very good. FIG. 7 provides data on growth of wheat treated with pesticide S (P), S plus the new formulations of *Trichoderma*, the new formulations of *Trichoderma* alone or the untreated control when the treated seeds were planted in soil infested with the soil pathogens *Pythium* or *Rhizoctonia*. As is evident, the treatment with the new formulation of *Trichoderma* was superior to the pesticide used alone. This data is also remarkable because the seeds were treated using a spinning disc (Hege) device, which illustrates that the encapsulation system also eliminates damage to the spores by the spinning disc.

Development of Wax-Based Formulations of Microorganisms to Provide Highly Potent Products and to Avoid Seed Dusting and Blow-Off.

As noted at the outset, seed dusting with dry products, especially talc is a problem. Not only can the dusts pose environmental issues, but active ingredients contained within the talc formulations may be removed from the seeds, thereby creating issues with efficacy. Waxes have been shown to adhere more firmly to seeds than other materials such as talc (e.g., US Patent Application 20150013221). As noted, Applicants have dust applications of various products that contain talc, and a non-clumping formulation that adheres well to seeds is needed.

This disclosure provides such a method. It comprises: (i) making the soybean oil based suspensions of *Trichoderma* spores or bacteria as described herein (with or without lecithin as needed for the organism). Other oils can be used with equal efficacy, but for maximum efficacy these may need to be vegetable oils that can be hydrolyzed by the microbe, thus providing a nontoxic food base for the microbes; and (ii) mixing the suspension with a waxy substance with appropriate properties for seed treatments.

Figure 11:
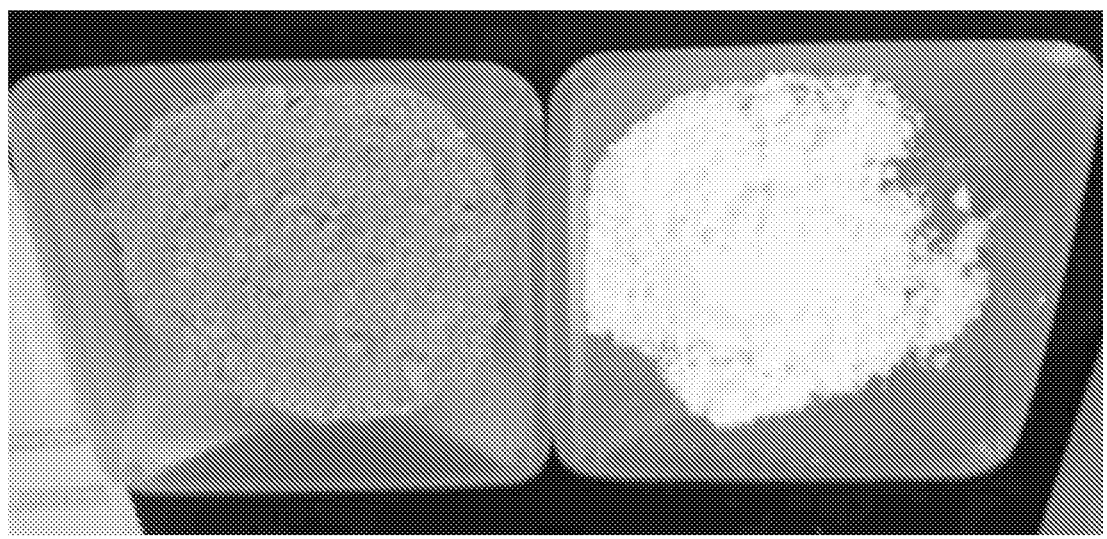
FIG. 11 shows the appearance of Aqua Tex oil and wax based formulations of *Trichoderma* (left) and *Bradyrhizobium* (right).

Applicants used Aqua-Tex 350 from Micropowders Inc. The ratio of wax to oil is preferably 5:1 or greater; the concept is that the oil in preparation will be dissolved into the wax. This expectation was realized and a free-flowing powder with excellent seed coating properties was obtained. The use of the oil suspensions provides starting materials with very high potency, up to $10^{11}$ cfu for bacteria and $10^{10}$ cfu/g for fungi. Many materials would be effective as the waxy component. This includes bee's wax, cadelilla wax and carnauba wax, synthetic waxes such as Aqua-Tex 350. There are a wide variety from which to choose. The powder so obtained can be further diluted or mixed to provide final products with different properties as desired. FIG. 11 shows an example of the products obtained.

The present disclosure is not to be limited in terms of the particular embodiments described in this application. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 conduits refers to groups having 1, 2, or 3 conduits. Similarly, a group having 1-5 conduits refers to groups having 1, 2, 3, 4, or 5 conduits, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

All references cited herein are incorporated by reference herein in their entireties and for all purposes to the same extent as if each individual publication, patent, or patent application was specifically and individually incorporated by reference in its entirety for all purposes.

What is claimed is:

1. A composition to enhance activity of herbicides against plant pests or plant diseases comprising: an emulsion containing water and a vegetable oil in a ratio of from about 1:1 to 0.5:4, 0.5 to 1.2% weight/volume of lecithin, 1 to 3% by weight based on the total weight of the emulsion of sodium stearate surfactant to form a stable emulsion, and an herbicide composition that includes at least one microbial metabolite that increases the resistance of plants to plant pests or plant diseases to create an herbicide microbial metabolite mixture; and wherein the stable emulsion can be diluted more than 100-fold in water without phase separation.

2. The composition of claim 1, wherein the vegetable oil is soy, corn, canola or safflower.

3. The composition of claim 1, wherein the lecithin is from soy or egg.

4. The composition of claim 1, wherein the at least one microbial metabolite is derived from *Trichoderma* spp.

5. The composition of claim 1, wherein the at least one microbial metabolite includes 6-pentyl pyrone, harzianic acid, hydra 1, harzinolide, 1 octene-3-ol or mixtures thereof.

6. The composition of claim 1, wherein the at least one microbial metabolite is derived from *Bacillus* spp.

7. The composition of claim 1, wherein the at least one microbial metabolite includes sufactin, iturin, fengycin, polyketides or other bacterial metabolites.

8. A method for enhancing activity of herbicides comprising the steps of:
   a.) preparing a stable emulsion consisting of a vegetable oil, water, 0.5% to 1.2% weight/volume of lecithin, and 1 to 3% by weight based on the total weight of the emulsion of a surfactant, wherein the ratio of water to vegetable oil is from about 1:1 to 0.5:4 in the emulsion, wherein the emulsion can be diluted more than 100 fold in water without phase separation;
   b.) adding to the stable emulsion an herbicide composition to form an herbicide emulsion mixture, wherein the herbicide composition includes at least one microbial metabolite that increases the resistance of plants to plant pests or plant diseases to create an herbiciden microbial metabolite mixture; and
   wherein the plant pest or plant disease control properties of herbicide are enhanced.

9. The method according to claim 8, comprising the further step of contacting a plant or plant seed with the herbicide emulsion mixture or a dilution thereof in additional water, wherein said contacting is carried out by broadcast application, liquid or dry in-furrow application, spray application, irrigation, injection, dusting, pelleting, or coating of the plant or the plant seed or a planting medium.

10. The method of claim 8, wherein the emulsion contains 1 to 3% by weight sodium stearate as the surfactant.

11. The method of claim 8, wherein the vegetable oil is soybean, canola, sunflower, peanut, or safflower.

12. The method of claim 8, wherein the lecithin is vegetable lecithin or egg lecithin.

13. The method of claim 8, wherein the plant pest or the plant disease control comprises plant pests or plant disease controls selected from the group consisting of nematodes, insects, arthropods, animals, bacterial species, viral species, fungal species, yeast species, prions, plant species, spores, systemic foliar disease control, and any combination thereof.

14. The method of claim 8, wherein the plant disease or plant pest controlled includes fungal plant pathogens, Oomcetes, insects, mites or nematodes.

15. The method of claim 8, wherein the plant disease controlled for is caused by nematodes *Heterodera, Melodigyne, Pratylemchus,* or *Longidorus.*

* * * * *